(12) United States Patent
Hwang et al.

(10) Patent No.: US 8,148,956 B2
(45) Date of Patent: *Apr. 3, 2012

(54) POWER FACTOR CORRECTION CIRCUIT AND METHOD OF DRIVING THE SAME

(75) Inventors: Jong-Tae Hwang, Seoul (KR); Jin-Sung Kim, Seoul (KR); Moon-Sang Jung, Seoul (KR); Dae-Ho Kim, Bucheon (KR); Sung-Yun Park, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 390 days.

This patent is subject to a terminal disclaimer.

(21) Appl. No.: 12/608,727

(22) Filed: Oct. 29, 2009

(65) Prior Publication Data

US 2010/0109615 A1 May 6, 2010

(30) Foreign Application Priority Data

Oct. 31, 2008 (KR) .......................... 10-2008-0108070

(51) Int. Cl.
*G05F 1/70* (2006.01)
(52) U.S. Cl. .......................................... 323/207; 363/89
(58) Field of Classification Search .................. 323/207, 323/222, 224, 272, 282; 363/21.04, 21.12, 363/21.16, 86, 89, 97, 98, 127
See application file for complete search history.

(56) References Cited

U.S. PATENT DOCUMENTS

| | | | | |
|---|---|---|---|---|
| 4,328,454 A | * | 5/1982 | Okuyama et al. | 318/803 |
| 5,689,175 A | * | 11/1997 | Hanson et al. | 322/28 |
| 7,016,204 B2 | * | 3/2006 | Yang et al. | 363/21.13 |
| 7,239,532 B1 | * | 7/2007 | Hsu et al. | 363/21.12 |
| 7,893,667 B2 | * | 2/2011 | Kitagawa et al. | 323/222 |

* cited by examiner

*Primary Examiner* — Rajnikant Patel
(74) *Attorney, Agent, or Firm* — Okamoto & Benedicto LLP (57) ABSTRACT

The present invention relates to a power factor correction circuit and a method of driving the power factor correction circuit. The power factor correction circuit according to the present invention includes a power transfer element configured to receive an input voltage, an input current corresponding to the input voltage flowing through the power transfer element, and a switch connected to the power transfer element and configured to control an output voltage generated by the current flowing through the power transfer element. The power factor correction circuit is configured to detect a zero voltage edge timing of the input voltage by detecting the input voltage, generate a reference clock signal having a frequency that varies according to the detected edge timing, generate a reference signal using the reference clock signal, generate an error amplification signal based on a difference between the output voltage and a predetermined error reference signal, generate the amplification reference signal by multiplying the reference signal by the error amplification signal, and control a switching operation of the switch using the amplification reference signal and a detection signal corresponding to a current flowing through the switch.

18 Claims, 7 Drawing Sheets

POWER FACTOR CORRECTION CIRCUIT AND METHOD OF DRIVING THE SAME

CROSS-REFERENCE TO RELATED APPLICATION

This application claims priority to and the benefit of Korean Patent Application No. 10-2008-0108070 filed in the Korean Intellectual Property Office on Oct. 31, 2008, the entire contents of which are incorporated herein by reference.

BACKGROUND OF THE INVENTION (a) Field of the Invention

The present invention relates to a power factor correction circuit and a method of driving the same.

(b) Description of the Related Art

A power factor denotes the efficiency of power transfer. In power transfer, power that is actually transferred is real power. The power factor is obtained by dividing the real power by an apparent power represented by the product of effective values of voltage and current of power. Here, if both the voltage and the current have a sine wave, the power factor changes according to a difference in phase between the voltage and the current. As the difference in the phase decreases, the power factor is improved. Accordingly, in general, power factor correction for improving the power factor refers to an operation for decreasing the difference in the phase between the voltage and the current of power.

A conventional power factor correction circuit is configured to generate a voltage signal by performing full-wave rectification on an input AC power source and then generate an inductor current having almost the same phase and frequency as the voltage signal. To this end, the power factor correction circuit controls the switching operation of a switch connected to the inductor in order to control the inductor current. The inductor is electrically connected to the switch. When the switch is turned on, the inductor current and the switching current are identical to each other. Accordingly, when the switch is turned on, the power factor correction circuit measures a current flowing through the switch and controls the switching operation of the switching based on the measured current. In more detail, the power factor correction circuit compares a current flowing through the switch and a reference signal corresponding to a full-wave rectified voltage, and controls the switching operation of the switch based on the comparison results. Since the reference signal varies depending on the full-wave rectified voltage, the current flowing through the switch element varies depending on the reference signal. Accordingly, the inductor current varies depending on the full-wave rectified voltage, so it has almost the same phase and frequency as the voltage and current of the input AC power source.

Here, the conventional power factor correction circuit uses a resistor element for detecting the full-wave rectified voltage and generating the reference signal based on the detected voltage. The full-wave rectified voltage is chiefly high, and it is difficult to integrate a resistor element that withstands a high voltage. Accordingly, a problem arises because it is difficult to integrate the power factor correction circuit. Further, additional power consumption is generated in the resistor element.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power factor correction circuit and a method of driving the same, which are capable of reducing power consumption through a simple configuration. An exemplary embodiment of the present invention provides a power factor correction circuit including a power transfer element configured to receive an input voltage and an input current corresponding to the input voltage flowing through the power transfer element, and a switch connected to the power transfer element and configured to control an output voltage generated by the current flowing through the power transfer element. The power factor correction circuit is configured to detect a zero voltage edge timing of the input voltage by detecting the input voltage, generate a reference clock signal having a frequency that varies according to the detected edge timing, generate a reference signal using the reference clock signal, generate an error amplification signal based on a difference between the output voltage and a predetermined error reference signal, generate the amplification reference signal by multiplying the reference signal by the error amplification signal, and control a switching operation of the switch using the amplification reference signal and a detection signal corresponding to a current flowing through the switch. The power factor correction circuit further includes: a capacitor charged to the input current and configured to generate the output voltage during a period in which the switch is turned off; an error amplifier configured to generate the error amplification signal based on the difference between the output voltage and the predetermined error reference signal; a reference signal generator configured to generate the reference signal corresponding to the input voltage; and a power factor correction controller configured to turn on the switch in synchronization with the clock signal having a predetermined cycle and to turn off the switch when the detection signal reaches the amplification reference signal. The reference signal generator includes: a voltage detector configured to generate an input detection voltage corresponding to the input voltage; a zero voltage detector configured to compare the input detection voltage and a predetermined first reference value, and generate a zero voltage detection signal having a first or second level according to the comparison result; a reference clock generator configured to generate the reference clock signal having a frequency that varies according to one cycle of the zero voltage detection signal; a digital sine wave generator synchronized with the zero voltage detection signal in response to the reference clock signal and the zero voltage detection signal and configured to generate a digital signal that increases according to the reference clock signal during one half of the one cycle of the zero voltage detection signal and that decreases according to the reference clock signal during the other half of the one cycle of the zero voltage detection signal; and a digital analog converter configured to generate the reference signal having a voltage level corresponding to a voltage level of the digital signal. The voltage detector includes a detection current generator configured to generate a current corresponding to the input voltage, and a current-voltage converter configured to generate a voltage corresponding to the current. The zero voltage detector is configured to generate the zero voltage detection signal of the first level when the input detection voltage is the first reference value or more, and generate the zero voltage detection signal of the second level when the input detection voltage is the first reference value or less. The reference clock generator is configured to detect a reference edge timing at which the zero voltage detection signal changes from the first level to the second level, calculate the one cycle of the zero voltage detection signal using two consecutive reference edge timings, and generate the rising and falling reference clock signal a predetermined number of times during the one calculated cycle. Unlike the above, the reference clock generator may be configured to detect predetermined edge timing as reference edge timing during a period from edge timing at which the zero voltage detection signal changes from the first level to the second level to edge timing at which the zero voltage detection signal changes from the second level to the first level, calculate the one cycle of the zero voltage detection signal using two consecutive reference edge timings, and generate the rising and falling reference clock signal a predetermined number of times during the one calculated cycle. The power transfer element may include an inductor, and one terminal of the inductor is connected to one terminal of the switch. The power factor correction circuit may further include a diode having an anode connected to the one terminal of the inductor, and a capacitor connected to a cathode of the diode. Unlike the above, the power transfer element may include a transformer including a primary side coil having one terminal to which the input voltage is applied and another terminal to which the switch is connected and a secondary side coil having a predetermined turn ratio for the primary side coil, and the current flowing through the power transfer element corresponds to a current flowing through the primary side coil. The power factor correction circuit further includes a diode having an anode connected to one terminal of the secondary side coil, wherein a capacitor is connected to a cathode of the diode. The power factor correction circuit further includes a bridge diode configured to generate a full-wave rectified sine wave input voltage by rectifying an input AC power source.

Another embodiment of the present invention provides a method of driving a power factor correction circuit including a power transfer element through which an input current corresponding to an input voltage flows, and a switch connected to the power transfer element and configured to control an output voltage generated by the current flowing through the power transfer element, the method including the steps of: generating a reference signal corresponding to the input voltage; generating an error amplification signal corresponding to the output voltage; generating an amplification reference signal by multiplying the error amplification signal and the reference signal; comparing the amplification reference signal and a detection signal corresponding to an input current by the input voltage; and controlling a switching operation of the switch according to the comparison result. The step of controlling the switching operation of the switch includes the steps of, when the detection signal reaches the amplification reference signal, turning off the switch, and turning on the switch every one cycle of a clock signal having a predetermined cycle. The step of generating the reference signal includes the steps of: generating an input detection voltage corresponding to the input voltage; comparing the input detection voltage and a predetermined first reference value and generating a zero voltage detection signal having a first or second level according to the comparison result; generating a reference clock signal having a frequency that varies according to one cycle of the zero voltage detection signal; generating a digital signal that increases according to the reference clock signal during one half of the one cycle of the zero voltage detection signal and decreases according to the reference clock signal during the other half of the one cycle of the zero voltage detection signal in synchronization with the zero voltage detection signal using the reference clock signal and the zero voltage detection signal; and generating the reference signal having a voltage level corresponding to a voltage level of the digital signal. The step of generating the zero voltage detection signal includes generating the zero voltage detection signal of the first level when the input detection voltage is the first reference value or more, and generating the zero voltage detection signal of the second level when the input detection voltage is the first reference value or less. The step of generating the reference clock signal includes detecting reference edge timing at which the zero voltage detection signal changes from the first level to the second level, calculating the one cycle of the zero voltage detection signal using two consecutive reference edge timings, and generating the rising and falling reference clock signal a predetermined number of times during the one calculated cycle. Unlike the above, the step of generating the reference clock signal includes detecting predetermined edge timing as reference edge timing during a period from edge timing at which the zero voltage detection signal changes from the first level to the second level to edge timing at which the zero voltage detection signal changes from the second level to the first level, calculating the one cycle of the zero voltage detection signal using two consecutive reference edge timings, and generating the rising and falling reference clock signal a predetermined number of times during the one calculated cycle.

According to the exemplary embodiments of the present invention, a power factor correction circuit and method using a reference signal having almost the same frequency and phase as an input voltage is provided.

Accordingly, a power factor correction circuit and method that is capable of reducing power consumption through a simple configuration is provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
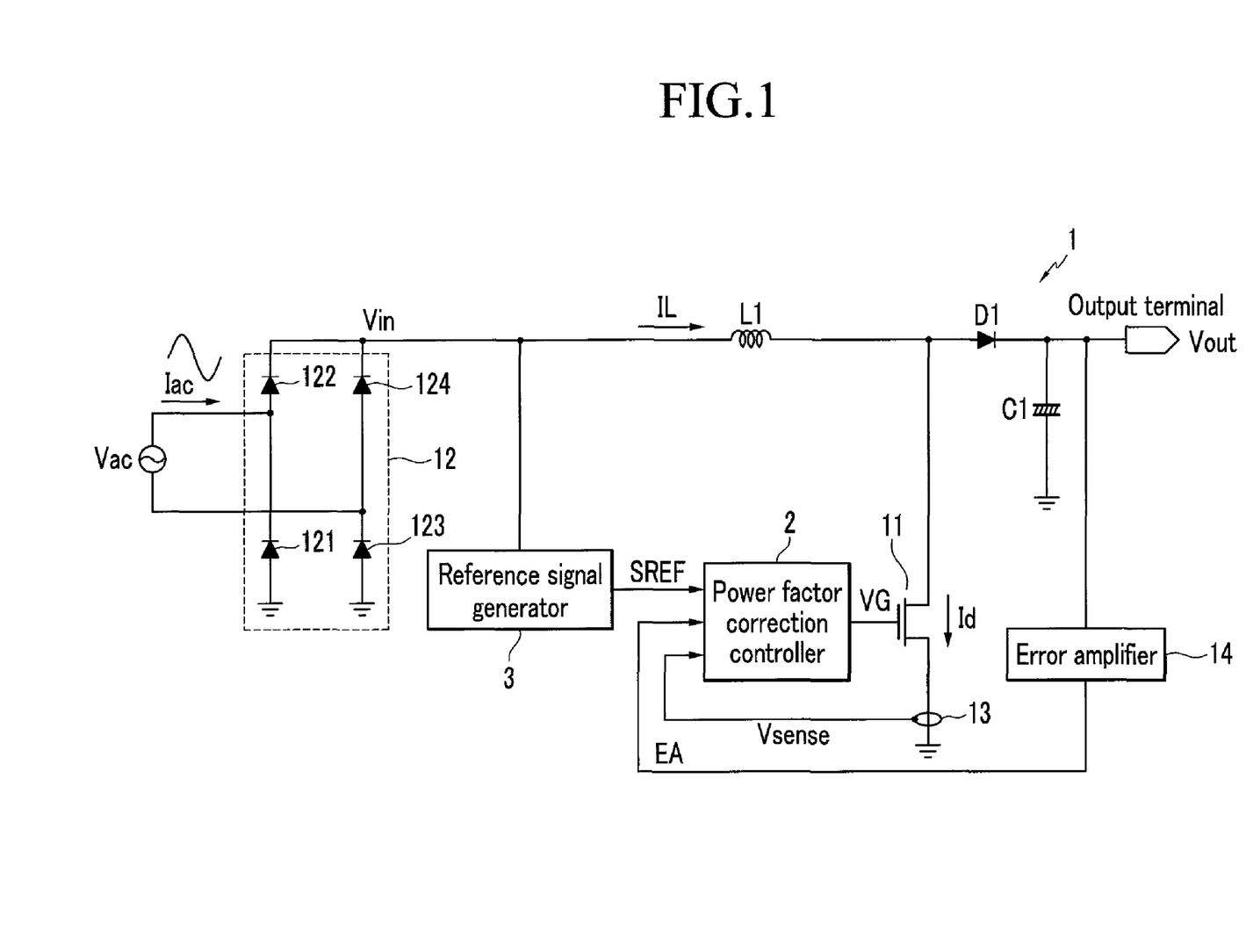
FIG. 1 is a circuit diagram of a power factor correction circuit 1 according to an exemplary embodiment of the present invention.

FIG. 1 is a circuit diagram of a power factor correction circuit 1 according to the exemplary embodiment of the present invention.

As shown in FIG. 1, the power factor correction circuit 1 includes a power factor correction controller 2, a reference signal generator 3, a switch 11, a bridge diode 12, a diode D1, a capacitor C1, an inductor L1, a current sensor 13, and an error amplifier 14. The switch 11 according to the exemplary embodiment of the present invention consists of an n-channel metal oxide semiconductor field effect transistor (NMOS-FET).

The bridge diode 12 is formed of four diodes 121 to 124, and is configured to perform full-wave rectification on an input AC voltage (Vac) and generate an input voltage (Vin).

The output terminal of the bridge diode 12 is connected to one terminal of the inductor L1. The one terminal of the inductor L1 is supplied with the input voltage (Vin), and the other terminal of the inductor L1 is connected to the anode of the diode D1.

The drain electrode of the switch 11 is connected to the anode of the diode D1 and the other terminal of the inductor L1.

An input current (IL) corresponding to the input voltage (Vin) flows through the inductor L1. The switch 11 controls the current flowing through the inductor L1.

When the switch 11 is turned off, the capacitor C1 is charged to the current flowing through the inductor L1, and so generates an output voltage.

The current sensor 13 is connected to the source electrode of the switch 11, and is configured to detect a current flowing through the switch 11 and generate a detection signal Vsense corresponding to the detected current.

When the switch 11 is turned on, the diode D1 is cut off and the inductor current (IL) flows through the switch 11. When the current flowing through the switch 11 (hereinafter referred to as a 'switching current (Is)') reaches a reference signal SREF generated by the reference signal generator 3, the switch 11 is turned off, the diode D1 becomes conductive by the inductor current (IL), and so the inductor current (IL) flows through the diode D1. The inductor current (IL) is charged in the capacitor C1 and then supplied to a load through an output terminal. The voltage charged in the capacitor C1 becomes an output voltage (Vout).

The error amplifier 14 is configured to amplify the difference between the output voltage (Vout) and a predetermined error reference signal (VR), and generate an error amplification signal EA. The error amplification signal EA is multiplied by the reference signal SREF. The output voltage (Vout) is changed. In order to control the output voltage (Vout), the reference signal SREF is increased or decreased according to the error amplification signal EA. That is, the error amplification signal EA determines a degree that the reference signal SREF is changed according to the output voltage (Vout).

The power factor correction controller 2 is configured to control an ON or OFF operation of the switch 11 using the reference signal SREF, the error amplification signal EA, and the detection signal Vsense.

The power factor correction controller 2 is described below with reference to FIG. 2.

Figure 2:
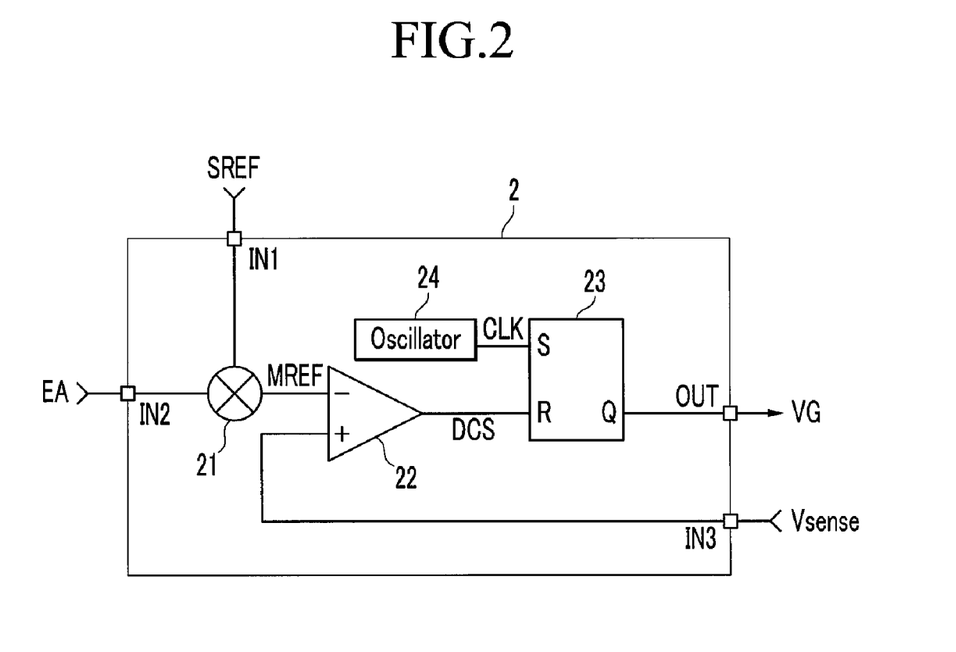
FIG. 2 is a circuit diagram of a power factor correction controller 2 according to the exemplary embodiment of the present invention.

FIG. 2 is a circuit diagram of the power factor correction controller 2 according to the exemplary embodiment of the present invention.

The power factor correction controller 2 includes a multiplier 21, a comparator 22, an SR flip-flop 23, and an oscillator 24.

The multiplier 21 is configured to amplify the reference signal SREF according to the error amplification signal EA, generate an amplification reference signal MREF, and output the amplification reference signal MREF to the inversion terminal (−) of the comparator 22.

The comparator 22 includes the inversion terminal (−) to which the amplification reference signal MREF is input and a non-inversion terminal (+) to which the detection signal Vsense is input. When the detection signal Vsense is the amplification reference signal MREF or more, the comparator 22 generates a duty control signal DCS of a high logic level. When the detection signal Vsense is less than the amplification reference signal MREF, the comparator 22 generates the duty control signal DCS of a low logic level.

The oscillator 24 is configured to generate a clock signal CLK having a predetermined cycle. A cycle of the clock signal CLK is the same as a switching cycle of the switch 11.

The SR flip-flop 23 includes a set terminal S to which the clock signal CLK having a predetermined cycle is input, a reset terminal R to which the duty control signal DCS is input, and an output terminal Q. The SR flip-flop 23 is configured to generate a gate signal VG by performing a logical operation on the two signals input to the set terminal S and the reset terminal R, respectively, and output the gate signal VG through the output terminal Q. In more detail, when the clock signal CLK input to the set terminal S is in a high logic level, the SR flip-flop 23 generates the gate signal VG of a high logic level. When the duty control signal DCS input to the reset terminal R is in a high logic level, the SR flip-flop 23 generates the gate signal VG of a low logic level. When both the signals input to the set terminal S and the reset terminal R, respectively, have a low logic level, the SR flip-flop 23 maintains a current gate signal VG.

If the output voltage (Vout) decreases and so the difference between the error reference signal (VR) and the output voltage (Vout) increases, the error amplification signal EA increases. Thus, the reference signal SREF increases according to the increased error amplification signal EA, so that the amplification reference signal MREF increases. Accordingly, since the time that the detection signal Vsense reaches the amplification reference signal MREF increases, the duty of the switch 11 increases and, therefore, the output voltage (Vout) increases. However, if the output voltage (Vout) increases such that the difference between the error reference signal (VR) and the output voltage (Vout) decreases, the error amplification signal EA decreases. Thus, since the reference signal SREF decreases according to the decreased error amplification signal EA, the amplification reference signal MREF decreases. Accordingly, since the time for the detection signal Vsense to reach the amplification reference signal MREF decreases, the duty of the switch 11 decreases, and therefore the output voltage (Vout) decreases.

The reference signal generator 3 according to the exemplary embodiment of the present invention is described below with reference to FIG. 3.

Figure 3:
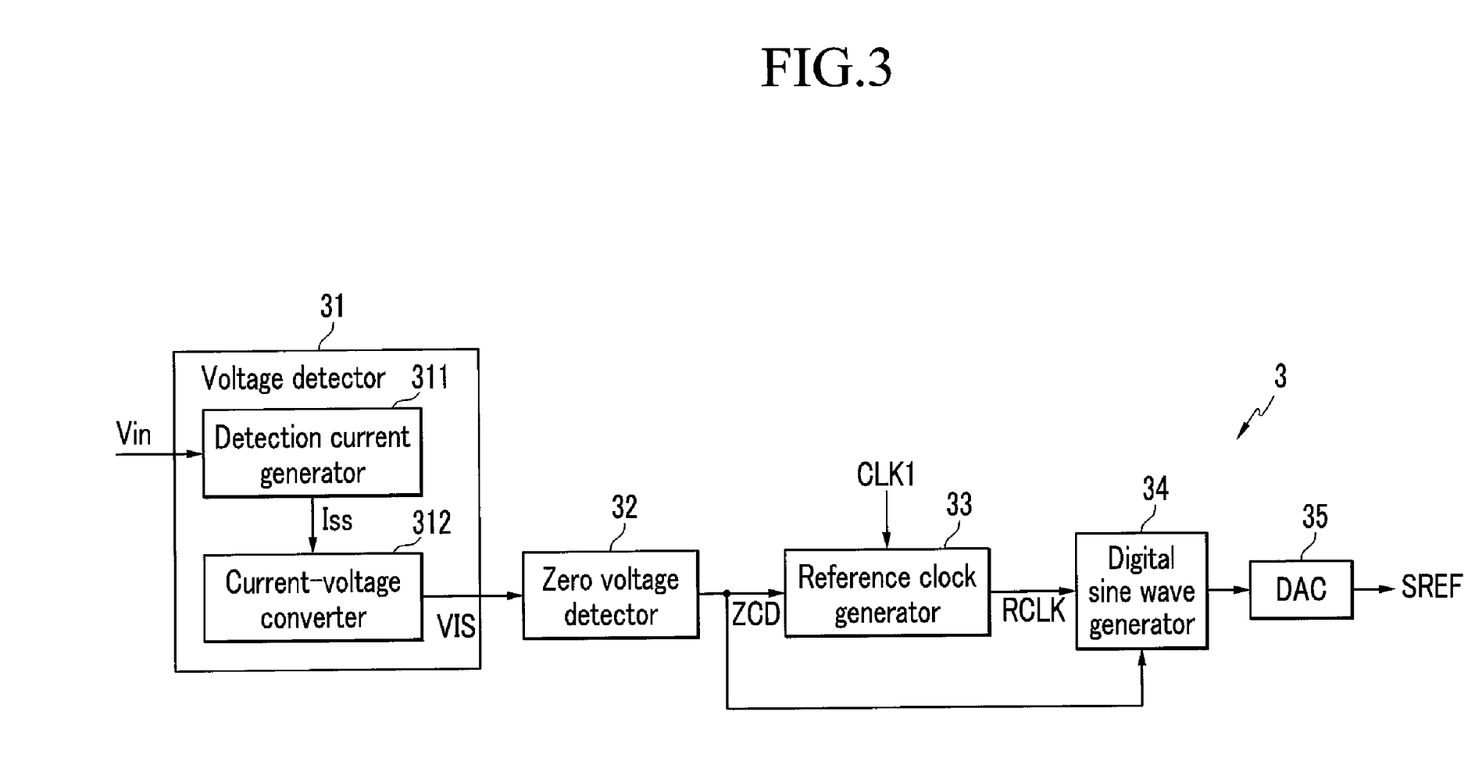
FIG. 3 is a circuit diagram of a reference signal generator 3 according to the exemplary embodiment of the present invention.

FIG. 3 is a circuit diagram of the reference signal generator 3 according to the exemplary embodiment of the present invention.

As shown in FIG. 3, the reference signal generator 3 includes a voltage detector 31, a zero voltage detector 32, a reference clock generator 33, a digital sine wave generator 34, and a digital-to-analog converter (hereinafter referred to as a 'DAC') 35.

The voltage detector 31 is configured to receive the input voltage (Vin) and generate an input detection voltage (VIS) corresponding to the input voltage (Vin). The voltage detector 31 includes a detection current generator 311 and a current-voltage converter 312. The detection current generator 311 is configured to generate a current signal corresponding to the input voltage (Vin).

The detection current generator 311 according to the exemplary embodiment of the present invention may be implemented in various ways.

Figure 4:
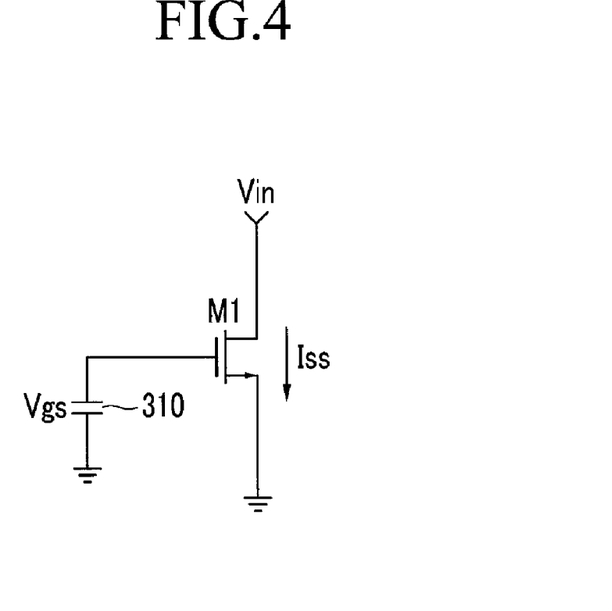
FIG. 4 is a simplified circuit diagram of a detection current generator 311 according to the exemplary embodiment of the present invention.

FIG. 4 is a simplified circuit diagram of the detection current generator 311 according to the exemplary embodiment of the present invention. In FIG. 4, the exemplary embodiment using an enhancement metal-oxide semiconductor field effect transistor (MOSFET) M1 is illustrated, for convenience of description.

As shown in FIG. 4, the input voltage (Vin) is input to the drain electrode of the transistor M1, a voltage (Vgs) of a voltage source 310 is input to the gate electrode of the transistor M1, and the source electrode of the transistor M1 is grounded. Here, the voltage (Vgs) may be set to a voltage having a level that can turn on the transistor M1. Accordingly, a current flowing through the transistor M1 is determined according to the input voltage (Vin) that is input to the drain electrode of the transistor M1. In general, when the transistor M1 is turned on, the transistor M1 operates in a linear region where a current that is proportional to the difference in the voltage between the drain and source electrodes of the transistor flows and a saturation region where a constant current flows irrespective of the difference in the voltage between the drain and source electrodes of the transistor M1. When the input voltage (Vin) is a predetermined threshold value or more, the transistor M1 operates in the saturation region and, a constant current flows through the transistor M1. When the input voltage (Vin) is the threshold value or less, a current that is proportional to the input voltage (Vin) flows through the transistor M1. Since the source electrode of the transistor M1 is grounded, the difference in the voltage between the drain and source electrodes of the transistor M1 is the same as the input voltage (Vin).

Figure 5:
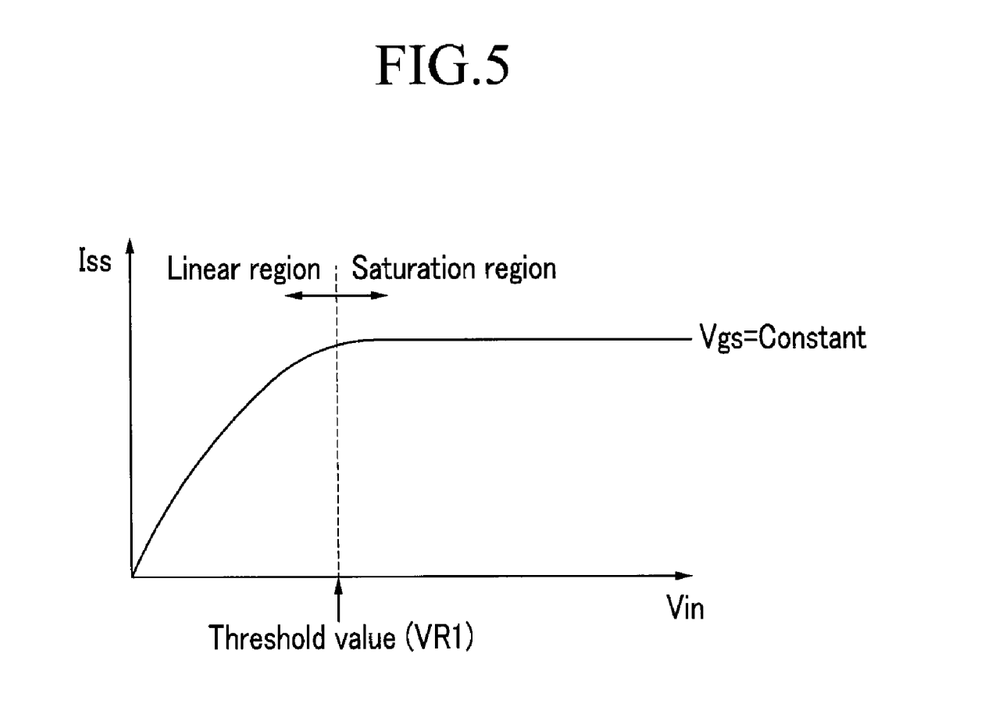
FIG. 5 is a diagram showing a relationship between a current (Iss) and an input voltage (Vin) flowing through a transistor M1 according to the exemplary embodiment of the present invention.

FIG. 5 is a diagram showing a relationship between a current (Iss) and the input voltage (Vin) flowing through the transistor M1 according to the exemplary embodiment of the present invention.

As shown in FIG. 5, as the input voltage (Vin) increases, the current (Iss) increases in the linear region. When the input voltage (Vin) becomes a threshold value or more, the current (Iss) remains constant in the saturation region.

Although the enhancement MOSFET is illustrated as an example in FIG. 4, the present invention is not limited to the above example. For example, a junction gate field-effect transistor (JFET), a depletion metal-oxide semiconductor field effect transistor (MOSFET), a bipolar junction transistor (BJT), or the like may be used instead of the enhancement MOSFET.

The current-voltage converter 312 is configured to generate the voltage signal (VIS) corresponding to the current (Iss) received from the detection current generator 311 and transfer the generated voltage signal (VIS) to the zero voltage detector 32.

The zero voltage detector 32 is configured to generate a zero voltage detection signal ZCD for predicting edge timing at which the input voltage (Vin) is '0' using the detection voltage (VIS) received from the voltage detector 31. The zero voltage detector 32 can compare the detection voltage (VIS) and a predetermined reference value close to 0. If, as a result of the comparison, the detection voltage (VIS) is the reference value or more, the zero voltage detector 32 can generate a signal of a high logic level as the zero voltage detection signal ZCD. If, as a result of the comparison, the detection voltage (VIS) is less than the reference value, the zero voltage detector 32 can generate a signal of a low logic level as the zero voltage detection signal ZCD.

The reference clock generator 33 is configured to receive a predetermined clock signal CLK1 and the zero voltage detection signal ZCD, and to generate a reference clock signal RCLK for generating the reference signal SREF having almost the same phase and frequency as the input voltage (Vin). Here, the reference signal SREF has a full-wave rectified sine wave that is similar to the input voltage (Vin). The predetermined clock signal CLK1 may be received from the oscillator 24. The reference clock generator 33 estimates two consecutive edge timings at which the input voltage (Vin) is '0' using the zero voltage detection signal ZCD. A period between the two estimated consecutive edge timings corresponds to one cycle of the input voltage (Vin). The reference clock generator 33 generates the reference clock signal RCLK that rises and falls the predetermined number of times during one cycle. The reference number of times is fixed to a constant value. Accordingly, when one cycle of the input voltage (Vin) changes, the frequency of the reference clock signal RCLK changes. The reference number of times is used to increase or decrease a value of the reference signal SREF in order to generate the reference signal SREF having a similar sine wave to the full-wave rectified sine wave. In the exemplary embodiment of the present invention, in order to generate the reference signal SREF having a similar sine wave to the full-wave rectified sine wave, the reference signal SREF has to be gradually increased during a predetermined period and then gradually decreased during a predetermined period. In this case, the increasing number of times and the decreasing number of times may be set to a constant value, and the sum of the increasing number of times and the decreasing number of times is called the reference number of times. The reference clock generator 33 generates the reference clock signal RCLK that increases and decreases the reference number of times during one cycle of the input voltage (Vin) after a second edge timing of the two consecutive edge timings. Further, the reference clock generator 33 estimates third edge timing at which the input voltage (Vin) becomes '0' after the second edge timing. The reference clock generator 33 detects the third edge timing as a new cycle of the input voltage (Vin) after the consecutive second edge timings. Next, the reference clock generator 33 generates the reference clock signal RCLK that increases and decreases the reference number of times during one cycle of the input voltage (Vin) after the third edge timing. Here, the reference clock signal RCLK is a clock signal that increases and decreases the reference number of times during a period from the second edge timing to the third edge timing. The edge timing at which the input voltage (Vin) becomes '0' uses the zero voltage detection signal ZCD, which is described later.

The reference clock signal RCLK having a frequency that varies according to the input voltage (Vin) is generated by repeatedly performing the above operation.

The digital sine wave generator 34 is configured to receive the zero voltage detection signal ZCD and the reference clock signal RCLK and generate digital information for generating the full-wave rectified sine wave synchronized to the input voltage (Vin) using the two signals. The digital information according to an exemplary embodiment of the present invention may have n-bit digital values that are consecutively arranged. During one cycle of the input voltage (Vin), the digital information includes n-bit digital values of the same number as the reference number of times. The digital sine wave generator 34 detects edge timing at which the input voltage becomes '0' using the zero voltage detection signal ZCD, and transfers a digital value having an n-bit unit to the DAC 35 at the rising or falling edge timing of the reference clock signal RCLK beginning with the edge timing at which the input voltage becomes '0'.

The digital information increases during a period corresponding to one cycle of an estimated input voltage (Vin) and decreases during a period corresponding to the remaining cycle of the estimated input voltage (Vin). It is controlled according to the reference number of times. For example, if the reference number of times is 26, a digital value is increased from a first rising or falling edge timing of the reference clock signal RCLK to a thirteenth rising or falling edge timing of the reference clock signal RCLK beginning with edge timing at which the input voltage (Vin) is estimated to be 0. An increment of the digital value is set to an appropriate value in order to generate the full-wave rectified sine wave. The digital value is decreased from a fourteenth rising or falling edge timing of the reference clock signal RCLK to a twenty-sixth rising or falling edge timing. A decrement of the digital value is set to a proper value in order to generate the full-wave rectified sine wave.

The example in which the digital value is transferred to the DAC 35 at the rising and falling edge timings of the reference clock signal RCLK has thus far been described. However, the present invention is not limited to the above example. For example, the digital value may be transferred to the DAC 35 only at the rising or falling edge timing of the reference clock signal. In this case, the reference clock signal RCLK has a double frequency as compared with the case where the digital value is transferred to the DAC 35 at the rising and falling edge timings of the reference clock signal RCLK.

The DAC 35 is configured to convert the input digital information into an analog voltage signal in real time and output the voltage signal. The voltage signal output from the DAC 35 becomes the reference signal SREF. The reference signal SREF has a similar shape to the full-wave rectified sine wave.

An operation of the power factor correction controller according to the exemplary embodiment of the present invention is described below with reference to FIG. 6.

Figure 6:
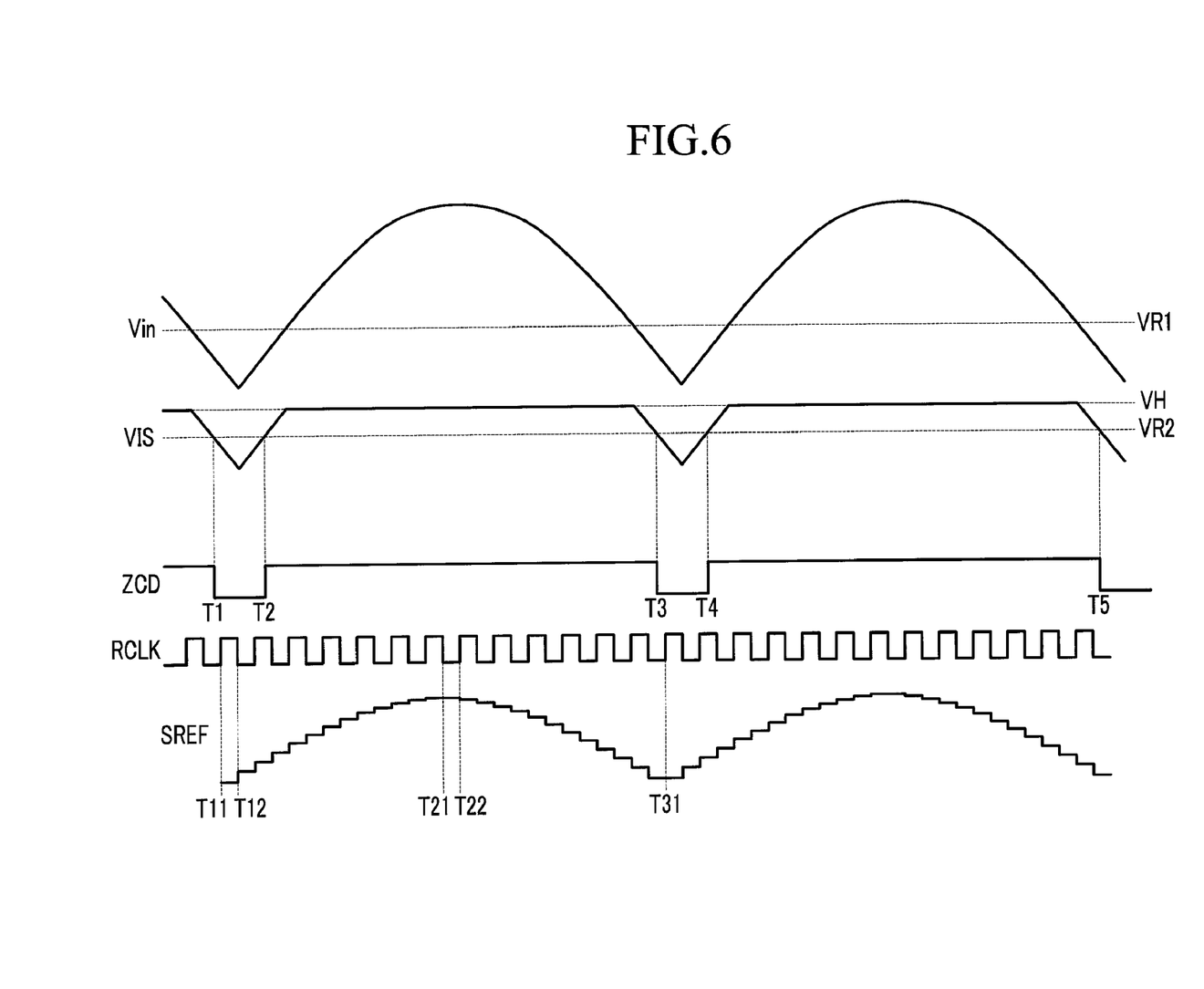
FIG. 6 is a diagram showing input and output signals of the reference signal generator 3 according to the exemplary embodiment of the present invention.

FIG. 6 is a diagram showing input and output signals of the reference signal generator 3 according to the exemplary embodiment of the present invention.

As shown in FIG. 6, the input voltage (Vin) has the full-wave rectified sine wave. When the input voltage (Vin) is a threshold value VR1 or more, the operation region of the transistor M1 of the detection current generator 311 becomes a saturation region. Thus, the current (Iss) that is constant and high irrespective of the input voltage (Vin) flows through the transistor M1. Accordingly, when the input voltage (Vin) is the threshold value VR1 or more, the input detection voltage (VIS) becomes a voltage (VH). When the input voltage (Vin) is less than the threshold value VR1, an input detection voltage (VIS) that is proportional to the input voltage (Vin) is generated.

When the input detection voltage (VIS) is less than a reference value VR2 at an edge timing T1, the zero voltage detection signal ZCD shifts to a low logic level. During the period T1-T2, the zero voltage detection signal ZCD maintains a low logic level because the input detection voltage (VIS) has the reference value VR2.

When the input detection voltage (VIS) becomes the reference value VR2 or more at the edge timing T2, the zero voltage detection signal ZCD shifts to a high logic level. During a period T2-T3, the zero voltage detection signal ZCD maintains a high logic level because the input detection voltage (VIS) has the reference value VR2 or more.

At the edge timing T3, the zero voltage detection signal ZCD shifts to a low logic level because the input detection voltage (VIS) is lower than the reference value VR2. At an edge timing T4, the zero voltage detection signal ZCD shifts to a high logic level because the input detection voltage (VIS) becomes the reference value VR2 or more. During the period T3-T4, the zero voltage detection signal ZCD maintains a low logic level because the input detection voltage (VIS) is less than the reference value VR2.

The reference clock generator 33 estimates the edge timing T1 (i.e., the falling edge timing of the zero voltage detection signal ZCD) and the edge timing T3 (i.e., a next falling edge timing of the zero voltage detection signal ZCD) as two consecutive edge timings at which the input voltage (Vin) becomes '0'. However, the present invention is not limited to the above example. For example, a predetermined edge timing between the periods T1 and T2 may be estimated as an edge timing at which the input voltage (Vin) becomes '0'. Intermediate edge timing between the periods T1 and T2 may be set as predetermined edge timing. The period T1-T2 is very short. A predetermined edge timing between the periods T1 and T2, or the edge timing T1 or the edge timing T2 at which the input voltage (Vin) becomes '0', may be estimated as a predetermined edge timing.

The reference clock generator 33 estimates the period T1-T3 as a period corresponding to one cycle of the input voltage (Vin), and determines a frequency of the reference clock signal RCLK based on the one estimated cycle.

In more detail, the reference clock generator 130 determines a frequency of the reference clock signal RCLK by dividing the one estimated cycle by the reference number of times. The reference clock generator 130 estimates a period from edge timing at which the zero voltage detection signal ZCD falls anterior to the edge timing T1 to the edge timing T1 as one cycle of the input voltage (Vin), and determines a frequency of the reference clock signal RCLK based on the estimated cycle. The reference clock generator 130 generates the reference clock signal RCLK having a frequency that is determined since the edge timing T1 at which the input voltage (Vin) is estimated to be '0'. In a similar way, the reference clock generator 130 determines a frequency of the reference clock signal RCLK by estimating a period from the edge timing T1 to the edge timing T3 as one cycle of the input voltage (Vin). The reference clock generator 130 generates the reference clock signal RCLK having a frequency that is determined since the edge timing T3 at which the input voltage (Vin) is estimated to be '0'. It is assumed that the n-bit digital value is set to a 4-bit digital value and that the reference number of times is set to 26, for convenience of description.

The digital sine wave generator 34 recognizes the edge timing T1 at which the zero voltage detection signal ZCD falls by detecting the zero voltage detection signal ZCD. The digital sine wave generator 34 recognizes an approximately intermediate point between the edge timing T1 and the edge timing T2 as edge timing at which a new cycle of the input signal (Vin) begins. If a gap between the periods T1 and T2 is very narrow, the edge timing T1 or the edge timing T2 may be recognized as the start point of a new cycle. Alternatively, predetermined edge timing between the edge timing T1 and the edge timing T2 may be recognized as the start point of a new cycle. The first rising edge timing T11 according to an exemplary embodiment of the present invention is predetermined edge timing close to the edge timing T1. At a first rising edge timing T11 of the reference clock signal RCLK, the digital sine wave generator 34 transfers a digital value '0000' to the DAC 35. Here, the reference clock signal RCLK is generated by estimating a period from edge timing at which the zero voltage detection signal ZCD falls anterior to the edge timing T1 to the edge timing T1 as one cycle of the input voltage (Vin). In response thereto, the DAC 35 outputs a voltage having the lowest level corresponding to the digital value '0000'. At a falling edge timing T12 of the reference clock signal RCLK, the digital sine wave generator 34 transfers a digital value '0001' to the DAC 35. In response thereto, the DAC 35 outputs a voltage having a level corresponding to the digital value '0001'. During the period where the digital value rises up to '0010', '0011', '0100', '0101', '0110', '0111', '1000', '1001', '1010', '1011', and '1100', the DAC 35 sequentially increases the level of a voltage signal with different increments of the voltage level according to the digital values. Here, the increment of the voltage level may be set such that the reference signal SREF is generated with a sine wave similar to the full-wave rectified sine wave. The reference number of times has been set to 26. Thus, if the digital value becomes '1100', the reference signal SREF has been increased during the number of times corresponding to half of the reference number of times. After generating the digital value '1100' corresponding to half of the reference number of times, the digital sine wave generator 34 generates the digital value '1100' again at the rising or falling edge timing of a next reference clock signal and then sequentially decreases the digital value beginning with the rising or falling edge timing of a second-next reference clock signal. In the exemplary embodiment of the present invention, in order to generate the reference signal SREF having a sine wave similar to the full-wave rectified sine wave, the highest digital value '1100' remains intact during one cycle of the reference clock signal RCLK. However, the present invention is not limited to the above example. For example, with the reference number of times being set to a higher value, the reference signal SREF is generated in a very similar way to the full-wave rectified sine wave.

At an edge timing T21, the digital sine wave generator 34 generates a digital value '1100' and transfers the generated digital value to the DAC 35. The DAC 35 outputs a voltage having a level corresponding to the digital value '1100'. At an edge timing T22, the digital sine wave generator 34 generates a digital value '1011' and transfers the generated digital value to the DAC 35. The DAC 35 outputs a voltage having a level corresponding to the digital value '1011'. As described above, the digital sine wave generator 34 sequentially transfers the digital values, decreasing to '0000', to the DAC 35. The DAC 35 generates voltage signals having levels corresponding to the digital values.

The digital sine wave generator 34 recognizes edge timing T3 at which the zero voltage detection signal ZCD falls by detecting the zero voltage detection signal ZCD. The digital sine wave generator 34 recognizes an approximately intermediate point between the edge timing T3 and edge timing T4 as edge timing at which a new cycle of the input signal (Vin) begins. If a gap between the period T3 and T4 is very narrow, the edge timing T3 or the edge timing T4 may be recognized as the start point of a new cycle, or a predetermined edge timing in a period from the edge timing T3 to the edge timing T4 may be recognized as the start point of a new cycle. A first rising edge timing T31 according to an exemplary embodiment of the present invention is close to the edge timing T3. At the first rising edge timing T31 of the reference clock signal RCLK, the digital sine wave generator 34 transfers the digital value '0000' to the DAC 35. Here, the reference clock signal RCLK is generated by estimating a period from the edge timing T1 to the edge timing T3 as one cycle of the input voltage (Vin). In response thereto, the DAC 35 outputs a voltage having the lowest level corresponding to the digital value '0000'. A subsequent operation is identical to the above operation, and a description thereof is omitted for simplicity.

As described above, in the exemplary embodiment of the present invention, the duty of the switch 11 is determined using the reference signal SREF having a similar frequency and phase as the input voltage (Vin). At an edge timing at which the detection signal Vsense reaches the reference signal SREF, the duty control signal DCS shifts to a high logic level and is input to the reset terminal R of the SR flip-flop 23. Accordingly, the gate signal VG shifts to a low logic level and the switch 11 is turned off. Further, when the clock signal CLK of a high logic level is input to the set terminal S of the SR flip-flop 23, the gate signal VG shifts to a high logic level and the switch 11 is turned on.

In the exemplary embodiment of the present invention, the zero voltage detection signal ZCD may not be normally generated. For example, if an edge timing at which the input voltage (Vin) is smaller than the threshold value VR1 is not detected, the zero voltage detection signal ZCD may maintain a high logic level without shifting to a low logic level. In this case, a frequency and phase of the input voltage (Vin) cannot be estimated using the zero voltage detection signal ZCD. Consequently, a cycle of the zero voltage detection signal ZCD cannot be specified.

In the exemplary embodiment of the present invention, the power factor correction circuit has been designed using the boost converter. However, the present invention is not limited to the above embodiment. For example, a reference signal having a similar frequency and phase to the input voltage (Vin) may be generated for power factor correction and applied to other power factor correction circuits. Hereinafter, a power factor correction circuit according to another exemplary embodiment of the present invention is described with reference to FIG. 7.

Figure 7:
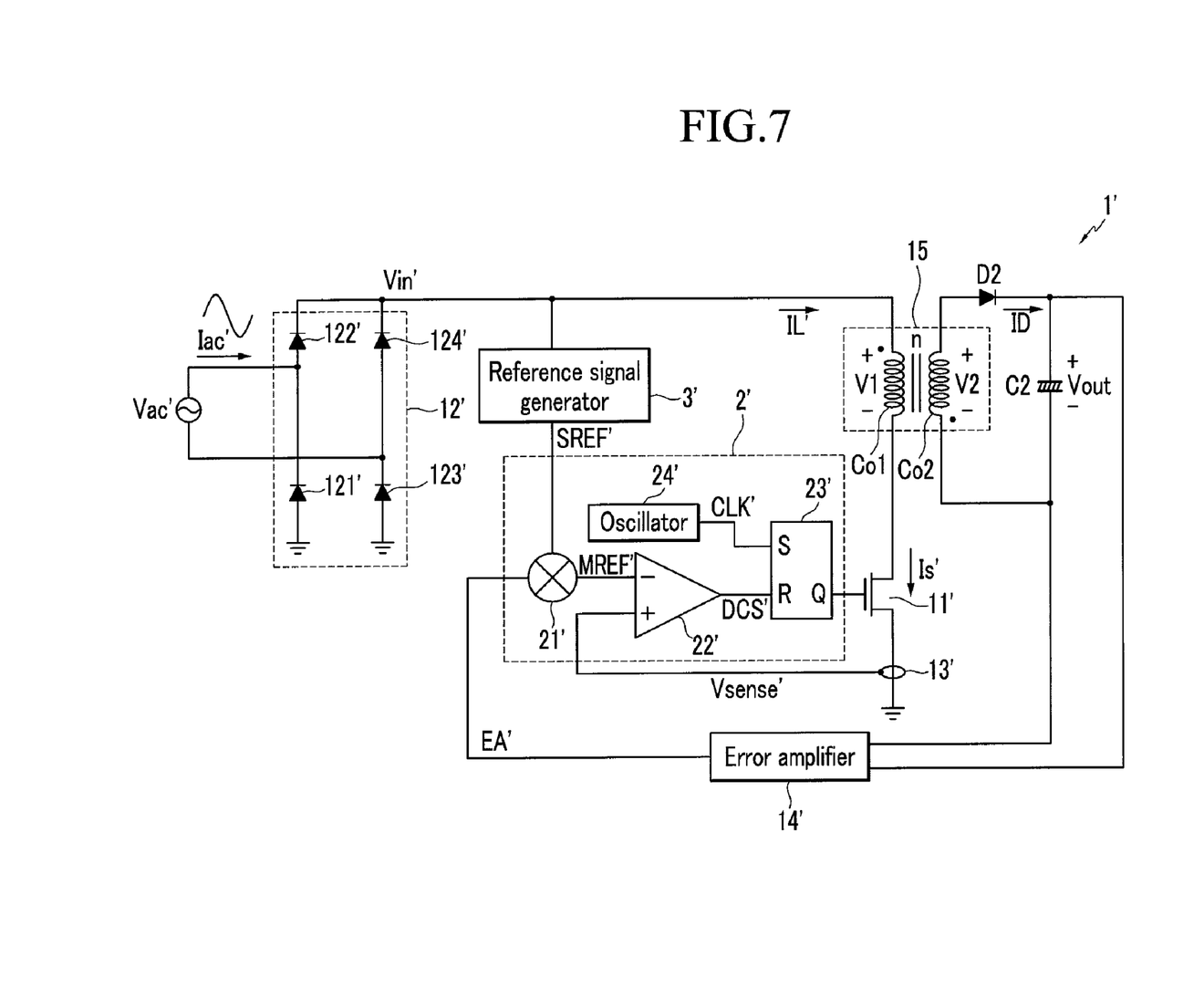
FIG. 7 is a circuit diagram of a power factor correction circuit 1' according to another exemplary embodiment of the present invention.

FIG. 7 is a circuit diagram of a power factor correction circuit 1' according to another exemplary embodiment of the present invention.

As shown in FIG. 7, the power factor correction circuit 1' according to another exemplary embodiment of the present invention is designed using a flyback converter.

A difference between the power factor correction circuit according to the above-described exemplary embodiment and the power factor correction circuit according to the current exemplary embodiment of the present invention is chiefly described. A description of the same parts between them is omitted in order to avoid redundancy.

The power factor correction circuit 1' includes a power factor correction controller 2', a reference signal generator 3', a switch 11', a bridge diode 12', a diode D2, a capacitor C2, a current sensor 13', an error amplifier 14', and a transformer 15. The switch 11' according to the present embodiment includes an n-channel metal oxide semiconductor field effect transistor (NMOSFET).

The transformer 15 includes a primary side coil Co1 and a secondary side coil Co2. An input voltage (Vin') is supplied to one terminal of the primary side coil Co1, and the other terminal of the primary side coil Co1 is connected to the drain electrode of the switch 11'. One terminal of the secondary side coil Co2 is connected to the anode of the diode D2, the other terminal of the secondary side coil Co2 is connected to one terminal of the capacitor C2, and the other terminal of the capacitor C2 and the cathode of the diode D2 are connected to each other. A voltage across the capacitor C2 is an output voltage (Vout). A turn ratio (n) is obtained by dividing the number of turns of the secondary side coil Co2 by the number of turns of the primary side coil Co1. A voltage V2 is obtained by multiplying the turn ratio by a voltage V1 and has a polarity opposite to that of the voltage V1.

When the switch 11' is turned on, the voltage V1 across the primary side coil Co1 becomes the input voltage (Vin), and a current (IL') flowing through the primary side coil Co1 increases. The current (IL') increases in proportion to the input voltage (Vin). A switching current (Is') is the same as the current (IL') during the period in which the switch 11' is turned on.

When the switch 11' is turned off, the voltage V1 of the primary side coil Co1 has a negative voltage that is obtained by dividing the output voltage (Vout) by the turn ratio (n). The current (IL') decreases in proportion to the output voltage (Vout). Here, the switching current (Is') is 0. When the switch 11' is turned off, the voltage V1 becomes a negative voltage and the voltage V2 becomes a positive voltage. Thus, the diode D2 becomes conductive, and so a current (ID) is transferred to the capacitor C2. The capacitor C2 is charged with the current (ID).

The construction of the power factor correction circuit 1' according to another exemplary embodiment of the present invention is identical to that of the power factor correction circuit according to the exemplary embodiment except that it includes the transformer 15. The current (IL') corresponds to the inductor current (IL) in the above-described exemplary embodiment.

An operation of the power factor correction circuit 1' is described below with reference to FIG. 8.

Figure 8:
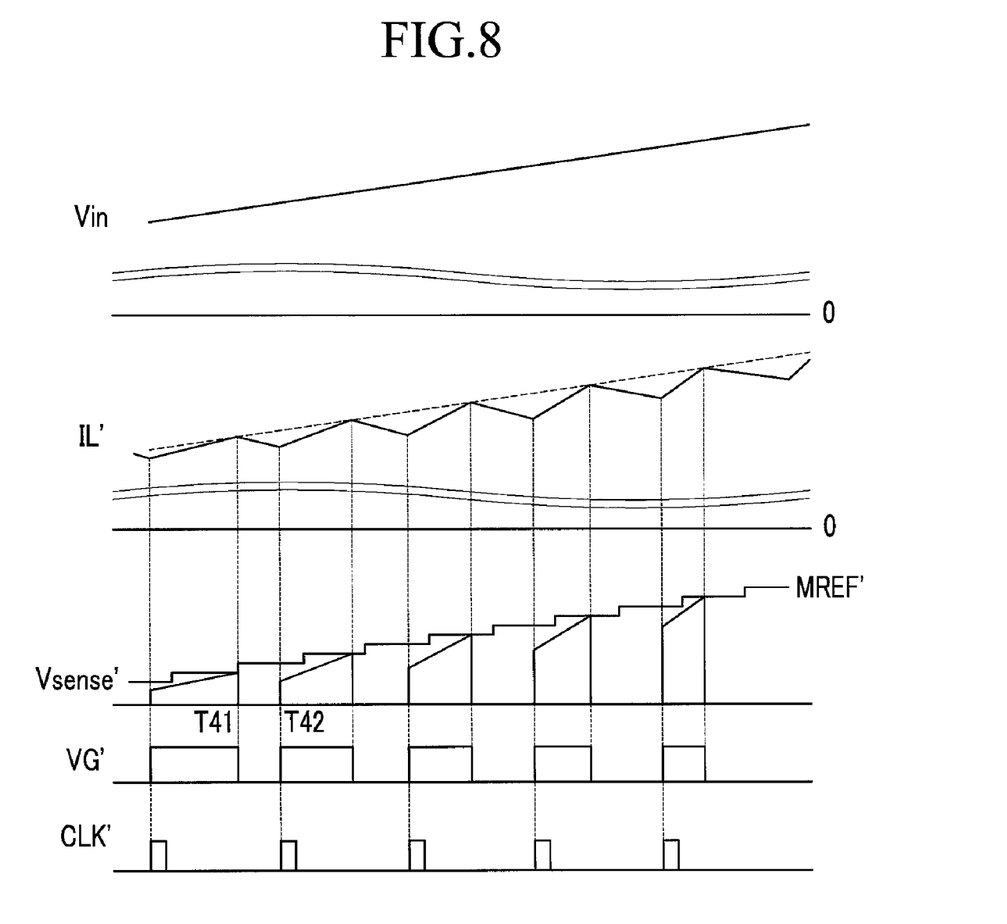
FIG. 8 is a diagram showing a current (IL'), a detection signal Vsense', and an amplification reference signal MREF' of the power factor correction circuit 1' according to another exemplary embodiment of the present invention.

FIG. 8 is a diagram showing a current (IL'), a detection signal Vsense', and an amplification reference signal MREF' of the power factor correction circuit 1' according to another exemplary embodiment of the present invention. FIG. 8 illustrates the current (IL'), the detection signal Vsense', and the amplification reference signal MREF' during a predetermined period, which rise during one cycle of the input voltage (Vin'). Here, the predetermined period is very short and is part of a full-wave rectified sine wave. In FIG. 8, a dotted line connecting the highest values of the input voltage (Vin) and the current (IL') has a waveform that is close to a straight line.

In FIG. 8, a detection signal SREF' rises according to the input voltage (Vin'). Accordingly, the amplification reference signal MREF' (i.e., the product of the detection signal SREF' and the error amplification signal EA') rises according to the input voltage (Vin'). The detection signal Vsense' has the same waveform as the switching current (Is'). The switching current (Is') is the same as the current (IL') during the period in which the switch 11' is turned on. Thus, during the period in which the current (IL') rises, the current (IL') and the switching current (Is') are the same.

At an edge timing T41 at which the detection signal Vsense' reaches the amplification reference signal MREF', a comparator 22' outputs a duty control signal DCS' of a high logic level, and an SR flip-flop 23' outputs a gate signal VG' of a low logic level. When a clock signal CLK' shifts to a high logic level at edge timing T42, the SR flip-flop 23' outputs the gate signal VG' of a high logic level.

The above operation is repeated, and the amplification reference signal MREF' shifts according to the input voltage (Vin'). Accordingly, the current (IL') has almost the same phase and frequency as the input voltage (Vin').

The current (IL') increases or decreases every one cycle of the switching operation of the switch 11'. If points having the highest values of the one cycle of the switching operation of the current (IL') are connected to each other, the current (IL') has almost the same phase and frequency as the input voltage (Vin').

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power factor correction circuit, comprising:
 a power transfer element configured to receive an input voltage with an input current corresponding to the input voltage flowing through the power transfer element; and
 a switch connected to the power transfer element and configured to control an output voltage generated by the current flowing through the power transfer element,
 wherein the power factor correction circuit is configured to detect a zero voltage edge timing of the input voltage by detecting the input voltage, generate a reference clock signal having a frequency that varies according to the detected edge timing, generate a reference signal using the reference clock signal, generate an error amplification signal based on a difference between the output voltage and a predetermined error reference signal, generate the amplification reference signal by multiplying the reference signal by the error amplification signal, and control a switching operation of the switch using the amplification reference signal and a detection signal corresponding to a current flowing through the switch.

2. The power factor correction circuit of claim 1, further comprising:
 a capacitor charged to the input current and configured to generate the output voltage during a period in which the switch is turned off;
 an error amplifier configured to generate the error amplification signal based on the difference between the output voltage and the predetermined error reference signal;
 a reference signal generator configured to generate the reference signal corresponding to the input voltage; and
 a power factor correction controller configured to turn on the switch in synchronization with the clock signal having a predetermined cycle and to turn off the switch when the detection signal reaches the amplification reference signal.

3. The power factor correction circuit of claim 2, wherein the reference signal generator comprises:
 a voltage detector configured to generate an input detection voltage corresponding to the input voltage;
 a zero voltage detector configured to compare the input detection voltage and a predetermined first reference value, and generate a zero voltage detection signal having a first or second level according to the comparison result;
a reference clock generator configured to generate the reference clock signal having a frequency that varies according to one cycle of the zero voltage detection signal;
a digital sine wave generator synchronized with the zero voltage detection signal in response to the reference clock signal and the zero voltage detection signal and configured to generate a digital signal that increases according to the reference clock signal during one half of the one cycle of the zero voltage detection signal and that decreases according to the reference clock signal during the other half of the one cycle of the zero voltage detection signal; and
a digital analog converter configured to generate the reference signal having a voltage level corresponding to a voltage level of the digital signal.

4. The power factor correction circuit of claim 3, wherein the voltage detector comprises:
a detection current generator configured to generate a current corresponding to the input voltage, and
a current-voltage converter configured to generate a voltage corresponding to the current.

5. The power factor correction circuit of claim 3, wherein the zero voltage detector is configured to
generate the zero voltage detection signal of the first level when the input detection voltage is the first reference value or more and generate the zero voltage detection signal of the second level when the input detection voltage is the first reference value or less.

6. The power factor correction circuit of claim 3, wherein the reference clock generator is configured to
detect a reference edge timing at which the zero voltage detection signal changes from the first level to the second level, calculate the one cycle of the zero voltage detection signal using two consecutive reference edge timings, and generate the rising and falling reference clock signal rising and falling a predetermined number of times during the one calculated cycle.

7. The power factor correction circuit of claim 3, wherein the reference clock generator is configured to
detect a predetermined edge timing as reference edge timing during a period from edge timing at which the zero voltage detection signal changes from the first level to the second level to edge timing at which the zero voltage detection signal changes from the second level to the first level, calculate the one cycle of the zero voltage detection signal using two consecutive reference edge timings, and generate the rising and falling reference clock signal a predetermined number of times during the one calculated cycle.

8. The power factor correction circuit of claim 1, wherein the power transfer element includes an inductor.

9. The power factor correction circuit of claim 8, wherein:
one terminal of the inductor is connected to one terminal of the switch; and
the power factor correction circuit further comprises a diode having an anode connected to one terminal of the inductor, wherein a capacitor is connected to a cathode of the diode.

10. The power factor correction circuit of claim 1, wherein the power transfer element comprises
a transformer comprising a primary side coil having one terminal to which the input voltage is applied and another terminal to which the switch is connected, and a secondary side coil having a predetermined turn ratio for the primary side coil, and the current flowing through the power transfer element corresponds to a current flowing through the primary side coil.

11. The power factor correction circuit of claim 10, further comprising
a diode having an anode connected to one terminal of the secondary side coil, wherein a capacitor is connected to a cathode of the diode.

12. The power factor correction circuit of claim 1, further comprising
a bridge diode configured to generate a full-wave rectified sine wave input voltage by rectifying an input AC power source.

13. A method of driving a power factor correction circuit, comprising a power transfer element through which an input current corresponding to an input voltage flows and a switch connected to the power transfer element and configured to control an output voltage generated by the current flowing through the power transfer element, the method comprising the steps of:
generating a reference signal corresponding to the input voltage;
generating an error amplification signal corresponding to the output voltage;
generating an amplification reference signal by multiplying the error amplification signal and the reference signal;
comparing the amplification reference signal and a detection signal corresponding to an input current by the input voltage; and
controlling a switching operation of the switch according to the comparison result.

14. The method of claim 13, wherein
the step of controlling the switching operation of the switch includes the steps of:
turning off the switch when the detection signal reaches the amplification reference signal; and
turning on the switch every cycle of a clock signal having a predetermined cycle.

15. The method of claim 13, wherein
the step of generating the reference signal includes the steps of:
generating an input detection voltage corresponding to the input voltage;
comparing the input detection voltage and a predetermined first reference value, and generating a zero voltage detection signal having a first or second level according to the comparison result;
generating a reference clock signal having a frequency that varies according to one cycle of the zero voltage detection signal;
generating a digital signal that increases according to the reference clock signal during one half of the one cycle of the zero voltage detection signal and decreases according to the reference clock signal during the other half of the one cycle of the zero voltage detection signal in synchronization with the zero voltage detection signal using the reference clock signal and the zero voltage detection signal; and
generating the reference signal having a voltage level corresponding to a voltage level of the digital signal.

16. The method of claim 15, wherein
the step of generating the zero voltage detection signal includes
generating the zero voltage detection signal of the first level when the input detection voltage is the first reference value or more, and generating the zero voltage detection signal of the second level when the input detection voltage is the first reference value or less.

17. The method of claim 15, wherein
the step of generating the reference clock signal includes detecting reference edge timing at which the zero voltage detection signal changes from the first level to the second level, calculating the one cycle of the zero voltage detection signal using two consecutive reference edge timings, and generating the rising and falling reference clock signal a predetermined number of times during the one calculated cycle.

18. The method of claim 15, wherein
the step of generating the reference clock signal includes detecting as reference edge timing predetermined edge timing as reference edge timing during a period from edge timing at which the zero voltage detection signal changes from the first level to the second level to edge timing at which the zero voltage detection signal changes from the second level to the first level, calculating the one cycle of the zero voltage detection signal using two consecutive reference edge timings, and generating the rising and falling reference clock signal a predetermined number of times during the one calculated cycle.

* * * * *